US011251965B2

(12) United States Patent
Minematsu

(10) Patent No.: US 11,251,965 B2
(45) Date of Patent: Feb. 15, 2022

(54) AUTHENTICATION TAG GENERATION APPARATUS, AUTHENTICATION TAG VERIFICATION APPARATUS, METHOD AND PROGRAM

(71) Applicant: NEC CORPORATION, Tokyo (JP)

(72) Inventor: Kazuhiko Minematsu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 295 days.

(21) Appl. No.: 16/605,869

(22) PCT Filed: Apr. 17, 2017

(86) PCT No.: PCT/JP2017/015494
§ 371 (c)(1),
(2) Date: Oct. 17, 2019

(87) PCT Pub. No.: WO2018/193507
PCT Pub. Date: Oct. 25, 2018

(65) Prior Publication Data
US 2020/0076609 A1 Mar. 5, 2020

(51) Int. Cl.
*H04L 29/06* (2006.01)
*H04L 9/32* (2006.01)
(Continued)

(52) U.S. Cl.
CPC ............ *H04L 9/3236* (2013.01); *G06F 21/64* (2013.01); *H04L 9/0643* (2013.01); *H04L 9/088* (2013.01);
(Continued)

(58) Field of Classification Search
CPC ..... H04L 9/3236; H04L 9/0643; H04L 9/088; H04L 9/3247; H04L 2209/38; H04L 9/3242; G06F 21/64; G09C 1/00
See application file for complete search history.

(56) References Cited

U.S. PATENT DOCUMENTS 9,594,928 B1 * 3/2017 Langhammer ........ H04L 9/0643
9,680,653 B1 * 6/2017 Bradbury ............ G06F 9/30007
(Continued)

FOREIGN PATENT DOCUMENTS

JP 2017-005409 A 1/2017
JP 2017-073716 A 4/2017
(Continued)

OTHER PUBLICATIONS

Michael T. Goodrich, et al., "Indexing Information for Data Forensics", ACNS, LNCS, 2005, pp. 206-221.
(Continued)

Primary Examiner — Sher A Khan
(74) Attorney, Agent, or Firm — Sughrue Mion, PLLC

(57) ABSTRACT

A hash function is computed for each item of a partial string obtained by dividing a message received according to a group testing matrix representing combinatorial group testing relating to the message, and an authentication tag for the partial string is generated using a value obtained by a combining operation of individual hash values by a combiner, wherein the combiner performs the combining operation of the individual hash values, by using a hash value of an item of an empty string as an identity element of the operation.

19 Claims, 15 Drawing Sheets

(51) Int. Cl.
  *G06F 21/64* (2013.01)
  *H04L 9/06* (2006.01)
  *H04L 9/08* (2006.01)

(52) U.S. Cl.
  CPC ........ *H04L 9/3247* (2013.01); *H04L 2209/38* (2013.01)

(56) References Cited

U.S. PATENT DOCUMENTS

| | | |
|---|---|---|
| 10,341,088 B2 | 7/2019 | Minematsu |
| 10,355,862 B2 | 7/2019 | Minematsu |
| 2002/0051537 A1* | 5/2002 | Rogaway .............. H04L 9/3242 380/46 |
| 2007/0069860 A1* | 3/2007 | Akiyama ........... G06K 19/0723 340/10.1 |
| 2007/0189524 A1* | 8/2007 | Rogaway .............. H04L 9/0637 380/37 |
| 2009/0138710 A1* | 5/2009 | Minematsu .......... H04L 9/0637 713/170 |
| 2013/0073865 A1* | 3/2013 | Kornafeld ............ H04L 9/3231 713/189 |
| 2014/0344227 A1* | 11/2014 | Grube ................ H04L 67/1097 707/691 |
| 2016/0173276 A1 | 6/2016 | Minematsu |
| 2018/0013550 A1 | 1/2018 | Minematsu |

FOREIGN PATENT DOCUMENTS

| | | |
|---|---|---|
| WO | 2015/015702 A1 | 2/2015 |
| WO | 2016/063512 A1 | 4/2016 |

OTHER PUBLICATIONS

Giovanni Di Crescenzo, et al., "Corruption-Localizing Hashing", ESORICS, LNCS, 2009, pp. 489-504.
Annalisa De Bonis, et al., "Combinatorial Group Testing for Corruption Localizing Hashing", COCOON, LNCS, 2011, pp. 579-591.
Ely Porat, et al., "Explicit Non-Adaptive Combinatorial Group Testing Schemes", ICALP, 2008, pp. 1-15.
Mihir Bellare, et al., "A New Paradigm for Collision-free Hashing: Incrementality at Reduced Cost", Advances in Cryptology—Eurocrypt, LNCS, 1997, pp. 163-192, vol. 1233.
Kazuhiko Minematsu, "Efficient Message Authentication Codes with Combinatorial Group Testing", ESORICS, LNCS, 2015, pp. 185-202, vol. 9326.
Annalisa De Bonis, et al., "A Group Testing Approach to Improved Corruption Localizing Hashing", Cryptology ePrint Archive, 2011, 18 pages.
International Search Report for PCT/JP2017/015494 dated Jul. 11, 2017 (PCT/ISA/210).
Notice of Reasons for Refusal dated Jun. 16, 2020, from the Japanese Patent Office in Application No. 2019-513520.

\* cited by examiner

AUTHENTICATION TAG GENERATION APPARATUS, AUTHENTICATION TAG VERIFICATION APPARATUS, METHOD AND PROGRAM

CROSS REFERENCE TO RELATED APPLICATIONS

This application is a National Stage of International Application No. PCT/JP2017/015494 filed Apr. 17, 2017, the disclosure of which is incorporated herein in its entirety by reference.

FIELD

The present invention relates to an authentication tag generation apparatus, an authentication tag verification apparatus, method and program.

BACKGROUND

There is a hash function that inputs an arbitrary message and outputs a short fixed-length hash value. Collision-difficulty (Collision-resistance: CR) may be given as cryptographic security of a hash function. Collision-resistance indicates with respect to a hash function H, difficulty to find $H(x)=H(x')$ for arbitrary different two inputs x and x', that is, to find two inputs that hash to the same output. Assume, for example, that an authentication tag generation apparatus holds a hash value $T=H(D)$ of a hash function $H( )$ having collision-resistance with respect to data D to be protected, as an authentication tag that is a tag for data authentication. Then, if the data D has been later altered to data D', the alteration can be securely detected by comparison between $T'=H(D')$ and the original hash value T by a verification apparatus. A commonly used cryptographic hash function such as SHA (Secure Hash Algorithm)-2 is regarded to have the collision-resistance and is used for detection of the alteration as mentioned above.

In association with an alteration (tampering) detection technology using the hash function $H( )$, technologies that have been disclosed in Non Patent Literatures 1 to 3, for example, are known. Non Patent Literatures 1 to 3 each disclose an example of a message alteration (tampering) detection technology using a combinatorial problem that is referred to as combinatorial group test (Combinatorial Group Testing: CGT). Non Patent Literature 4 discloses a method for determining an appropriate number of tests and an item for each test in the group testing, using a coding theory.

Generally, in case of a method (also referred to as "one-tag method") that generates one authentication tag by applying a hash function to an entirety of a message one time, it is impossible to obtain information of an altered position in the message. This is because, a hash value, which is a random value, becomes completely different from a proper value, when the message gets altered. To cope with this problem, there is, for example, a method of dividing the message into arbitrary portions and applying a hash function to each portion rather than applying a hash function to the entirety of the message one time.

According to this method, it becomes possible to perform checking for each segment. That is, it becomes possible to identify an altered position of the message, within a range of a divided portion. To take an example, there may be given an example in which, when a message M is composed of m items $M[1], \ldots M[m]$, a hash function is applied to each item to obtaining authentication tags $T[1]=H(M[1]), \ldots, T[m]=H(M[m])$. The obtained m number of authentication tags $(T[1], \ldots, T[m])$ may preferably be held in a location where there is no danger of alteration, for example. Each item is also referred to as a "block".

A method of applying a hash function to each item that is a minimum unit from which alteration is to be detected to generate an authentication tag for each item, may be referred to as "each-tag method". As examples of message division, division of data on a hard disk for each file or for each disk sector, for example, may be given. However, in the each-tag method, since m authentication tags are generated for m items, there is a problem that an increase in an amount of data to be stored is large.

Then, as disclosed in each of Non Patent Literature 1 and Non Patent Literature 2, a technique in which a message is decomposed into a plurality of partial strings that permit mutual overlapping, using CGT and a hash function is applied to each of these partial strings, may be used. When the message M is composed of seven items as in the message $M=(M[1], \ldots, M[7])$, for example, the message M may be decomposed into three partial strings $S[1], \ldots, S[3]$.

$$S[1]=(M[1],M[2],M[3],M[4]),$$

$$S[2]=(M[1],M[2],M[5],M[6]),$$

$$S[3]=(M[1],M[3],M[5],M[7]) \quad (1)$$

Here, a case is assumed where a hash function $H( )$ is applied to each of the partial strings to compute the following three authentication tags T[1] to T[3]:

$$T[1]=H(S[1]),$$

$$T[2]=H(S[2]),$$

$$T[3]=H(S[3]) \quad (2)$$

In this case, the number of the authentication tags of m (seven) that is required in each-tag method can be reduced to three of T[1] to T[3]. An altered position is identified or confined by using a result of verification of each (T[i], S[i]), based on a CGT theory. Hereinafter, the above-listed partial strings S[1] to S[3] will also be referred to as a "first decomposition example" when example of partial strings are given.

In CGT, when the number of items that have been altered is a predetermined number or less, even the items that have been altered can be identified by devising a way to obtain partial strings. What partial strings the message is decomposed into, and what kind of alteration item is able to be identified as a result of the decomposition, are closely associated with the combinatorial problem (CGT), as has been disclosed in Non Patent Literature 1, for example. Non Patent Literature 1 discloses a method of generating a CGT matrix using random numbers having a specific distribution. Non Patent Literature 2 discloses a method of generating a CGT matrix using a circulant matrix. Non Patent Literature 3 discloses a method of more explicitly using the CGT and a hash function. Non Patent Literature 4 discloses a method of generating a group testing matrix using a coding theory so that the number of tests s achieves $0 (d^2 \log_2 (m))$.

A group testing matrix (also referred to as a "CGT matrix") is a binary matrix that represents partial strings (a combination of items) for each test that is used for group testing. In the CGT composed of r items and s tests, for example, a CGT matrix W that is a binary matrix of s rows and r columns is generated, and the tests are performed according to the generated CGT matrix W. It only suffices that a case where a value of an element in an ith row and a jth column of the CGT matrix W is "1", indicates that an ith item in a jth test is included in a test. Hereinafter, the method of applying a hash function for each group test using the CGT, as described in each of Non Patent Literatures 1 to 3, may be referred to as "simple CGT-tag method".

When alteration detection of a data group stored in a database system or the like is to be performed using an authentication tag, an illegal personnel is unlikely to alter a large amount of items (of files and disk sectors) all at once due to an actual system constraint or the like. According to simple CGT-tag method by which an authentication tag is generated for each test (more specifically, for each partial string) using the CGT, a database system can be constructed in which an location of an alteration that may actually happen can be identified, while reducing a total number of authentication tags. It is noted that as for an arbitrary alteration, a property of being able to detect a fact that there was alteration, remains unchanged, even if a hash function is applied to each test of the CGT, as in the case of applying a hash function to each item.

Non Patent Literature 1 discloses an example where a message authentication code (Message Authentication Code: MAC) that is an output value of a keyed hash function is used as an authentication tag. Non Patent Literature 2 discloses an example where a hash value that is an output value of a keyless hash function is used. In the case of the keyless hash function, anyone can perform a tag computation, so that, generally, it is needed to store an obtained tag (hash value) in a secure location different from the location of a message. An effect (alteration detection effect) that can be obtained is basically the same irrespective of whether a hash function is with key or without key. When the simple CGT-tag method as disclosed in each of Non Patent Literatures 1 to 3 is used, identification or confinement of an alteration location as well as determination of presence or absence of an alteration can be performed, while reducing the total number of authentication tags as compared with the each-tag method.

However, the method (simple CGT-tag method) which generates an authentication tag for each test by simply using CGT, has a problem that computational complexity will greatly increase as compared with one-tag method.

A description will be given about an example where each item corresponding to an element (component) whose value is "1" is extracted and connected (also referred to concatenated). When an index of each test is indicated by $i=1, \ldots, s$, and an index of each item is indicated by $j=1, \ldots, m$, this method includes:

finding a column j in an ith row of a CGW matrix W that has a value of "1" is found for each i, calculating, for each j that has been found, an output which is obtained by providing a corresponding item M[j] to a first hash function H( ), concatenating all outputs that have been obtained and then inputting a result of the concatenation to a second hash function H'( ), and setting an output that has been obtained to an authentication tag T[i] corresponding to the ith test.

The above operation is performed for each I to obtain an authentication tag list TL=(T[1], . . . , T[s]).

FIG. 1 is a schematic diagram illustrating an example of applying a hash function to a first decomposition example (FIG. 1 is explained as a "simple and honest method" in Patent Literature 1). The following is a representation of the content illustrated in FIG. 1, using simple expressions.

$i=1$

[First Hash Function Application Process]

$$Z[i]=H(M[1])\|H(M[2])\|H(M[3])\|H(M[4]) \quad (3)$$

[Second Hash Function Application Process]

$$T[i]=H'(Z[i]) \quad (4)$$

$i=2$

[First Hash Function Application Process]

$$Z[i]=H(M[1])\|H(M[2])\|H(M[5])\|H(M[6]) \quad (5)$$

[Second Hash Function Application Process]

$$T[i]=H'(Z[i]) \quad (6)$$

$i=3$

[First Hash Function Application Process]

$$Z[i]=H(M[1])\|H(M[3])\|H(M[5])\|H(M[7]) \quad (7)$$

[Second Hash Function Application Process]

$$T[i]=H'(Z[i]) \quad (8)$$

An authentication tag list $$TL=(T[1],T[2],T[3]) \quad (9)$$

is obtained by the above operations.

In this method, the number of calling the first hash function H( ) in order to obtain the authentication tag list TL needs to be approximately (the number of items m)×(the number of tests s)=ms times (refer to those enclosed by broken lines in FIG. 1).

Patent Literature 1 discloses a configuration in which the number of calling a first hash function H( ) for obtaining an authentication tag list TL has just been needed to be the same as the number of items m. In the disclosure of Patent Literature 1, when a message that is targeted for alteration detection is decomposed into M=(M[1], . . . , M[m]) (where m is the number of items) and the number of combinatorial group tests is indicated by s, two-layered hash tree application means prepares s initialized state variables Z[1], . . . , Z[s]. The two-layer hash tree application means applies an jth item M[j], where $j=1, \ldots, m$, to the first hash function H( ) to obtain an intermediate hash value H(M[j]). When there is a test i (where $i=1, \ldots, s$) that uses the item, the two-layer hash tree application means performs a process of concatenating the intermediate hash value H(M[j]) to the state variable Z[i], for each j, and applies each of state variables Z[1], . . . , Z[s] that have been finally obtained to a second hash function H'( ) to generate s number of authentication tags.

A function that is used for standard block encryption such as AES (Advanced Encryption Standard) or a hash function such as SHA (Secure Hash Algorithm)-2 may be used as each of the first hash function H( ) and the second hash function H'( ). Each of The first hash function H( ) and the second hash function H'( ) may be so configured as to include (concatenate) different constants (such as 0 and 1) in an input item, using a single function.

[PTL 1]
JP Patent Kokai Publication No. JP2017-5409A
[PTL 2]
International Publication No. WO2016/063512

[NPL1]
Michael T. Goodrich, Mikhail J. Atallah, Roberto Tamassia, "Indexing Information for Data Forensics", Applied Cryptography and Network Security, Third International Conference, ACNS 2005, New York, N.Y., USA, Jun. 7-10, 2005, p. 206-221.

[NPL2]
Giovanni Di Crescenzo, Shaoquan Jiang, Reihaneh Safavi-Naini, "Corruption-Localizing Hashing", Computer Security—ESORICS 2009, 14th European Symposium on Research in Computer Security, Saint-malo, France, Sep. 21-23, 2009. p. 489-504.

[NPL 3]
Annalisa De Bonis, Giovanni Di Crescenzo, "Combinatorial Group Testing for Corruption Localizing Hashing", COCOON 2011, p. 579-591.

[NPL 4]
Ely Porat, Amir Rothschild, "Explicit Non-Adaptive Combinatorial Group Testing Schemes", ICALP 2008.

[NPL 5]
MIHIR BELLARE, DANIELE MICCIANCIO, "A New Paradigm for Collision-free Hashing: Incrementality at Reduced Cost", Advances in Cryptology—Eurocrypt 1997, volume 1233 of Lecture Notes in Computer Science, pages 163-192. Springer-Verlag, 11-15 May 1997.

SUMMARY

An analysis of the related art will be given below.

Computational complexity is large in the example disclosed in Patent Literature 1 or the like, in which the two-layer hash tree is applied. A common hash function has a linear order of computational complexity with respect to an input length. As illustrated in FIG. 2, for example, a length of an input $Z[i]$ for the second hash function $H'(\ )$ depends on the number of items a.

$$Z[i]=H(M[1])\|H(M[2])\| \ldots \|H(M[a])$$

$$T[i]=H'(Z[i]) \tag{10}$$

In the CGT that enables to identify an alteration of an arbitrary single item in a message M whose number of items is a, the input $Z[i]$ for the second hash function $H'(\ )$ is $O(a)$.

The present invention has been devised in view of the above-mentioned problem. An object of the present invention is to provide an authentication tag generation apparatus, an authentication tag verification apparatus, an authentication tag generation method, an authentication tag verification method, and a program, each enabling to suppress an increase in a calculation amount.

According to an aspect of the present invention, there is provided an authentication tag generation apparatus comprising:

a hash function application part configured to compute a hash function for each item included in a partial string obtained by dividing a message received according to a group testing matrix representing combinatorial group testing relating to the message, and generate an authentication tag for the partial strings using a value obtained by a combining operation of individual hash values by a combiner, the combiner performing the combining operation of the individual hash values using a hash value of an item of an empty string as an identity element of the operation.

According to another aspect of the present invention, there is provided an authentication tag verification apparatus comprising:

a data input part configured to receive a message to be verified, an authentication tag for each of partial strings obtained by division of the message according to a group testing matrix representing combinatorial group testing relating to the message, and the group testing matrix, as inputs;

a verification-use authentication tag generation part configured to compute a hash function for each item included in a partial string obtained by division according to the group testing matrix and generate an authentication tag for the partial string using a value obtained by a combining operation of individual hash values by a combiner, wherein the combiner performs the combining operation of the individual hash values by using a hash value of an item of an empty string as an identity element of the operation;

an authentication tag verification part configured to compare the verification-use authentication tag generated by the verification-use authentication tag generation part and the authentication tag received by the data input part to perform verification as to whether an alteration is present; and a verification result output part configured to output a result of the verification by the authentication tag generation part.

According to still another aspect of the present invention, there is provided an authentication tag generation method by a computer, the method comprising:

computing a hash function for each item included in a partial string obtained by dividing a message received according to a group testing matrix representing combinatorial group testing relating to the message; and generating an authentication tag for the partial string using a value obtained by a combining operation of individual hash values by a combiner, wherein the combiner performs the combining operation of the individual hash values, by using a hash value of an item of an empty string as an identity element of the operation.

According to yet another aspect of the present invention, there is provided an authentication tag verification method comprising:

receiving a message to be verified, an authentication tag for each of partial strings obtained by division of the message according to a group testing matrix representing combinatorial group testing relating to the message, and the group testing matrix, as inputs;

computing a hash function for each item included in each of partial strings obtained by division according to the group testing matrix and generating a verification-use authentication tag for each of the partial strings using a value obtained by a combining operation of individual hash values by a combiner, wherein the combiner performs the combining operation of the individual hash values by using a hash value of an item of an empty string as an identity element of the operation;

comparing the verification-use authentication tag and the authentication tag received to perform verification as to whether an alteration is present; and outputting a result of the verification.

According to still another aspect of the present invention, there is provided a program causing a computer to execute processing comprising:

computing a hash function for each item included in a partial string obtained by dividing a message received according to a group testing matrix representing combinatorial group testing relating to the message; and generating an authentication tag for the partial string using a value obtained by a combining operation of individual hash values, in the combining operation, the individual hash values being combined by using a hash value of an item of an empty string as an identity element of the operation.

According to still another aspect of the present invention, there is provided a program to cause a computer to execute processing comprising:

receiving a message to be verified, an authentication tag for each of partial strings obtained by division of the message according to a group testing matrix representing combinatorial group testing relating to the message, and the group testing matrix, as inputs;

computing a hash function for each item included in each of partial strings obtained by division according to the group testing matrix and generating a verification-use authentication tag for each of the partial strings using a value obtained by a combining operation of individual hash value, in the combining operation, the individual hash values being combined by using a hash value of an item of an empty string as an identity element of the operation;

comparing the verification-use authentication tag and the authentication tag received to perform verification as to whether an alteration is present; and outputting a result of the verification.

According to yet a further another aspect of the present invention, there is provided a non-transitory computer readable recording medium, such as a semiconductor storage (e.g., RAM (Random Access Memory), a ROM (Read Only Memory), or an EEPROM (Electrically Erasable and Programmable ROM)), an HDD (Hard Disk Drive), a CD (Compact Disc), or a DVD (Digital Versatile Disc), which is a computer readable recording medium that has stored therein the program according to the aspect described above.

According to an aspect of the present invention, an authentication tag generation apparatus, it is possible to provide an authentication tag generation method, an authentication tag verification method, and a program, each enabling suppression of an increase in an amount of computation. Still other features and advantages of the present invention will become readily apparent to those skilled in this art from the following detailed description in conjunction with the accompanying drawings where only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION

Figure 1:
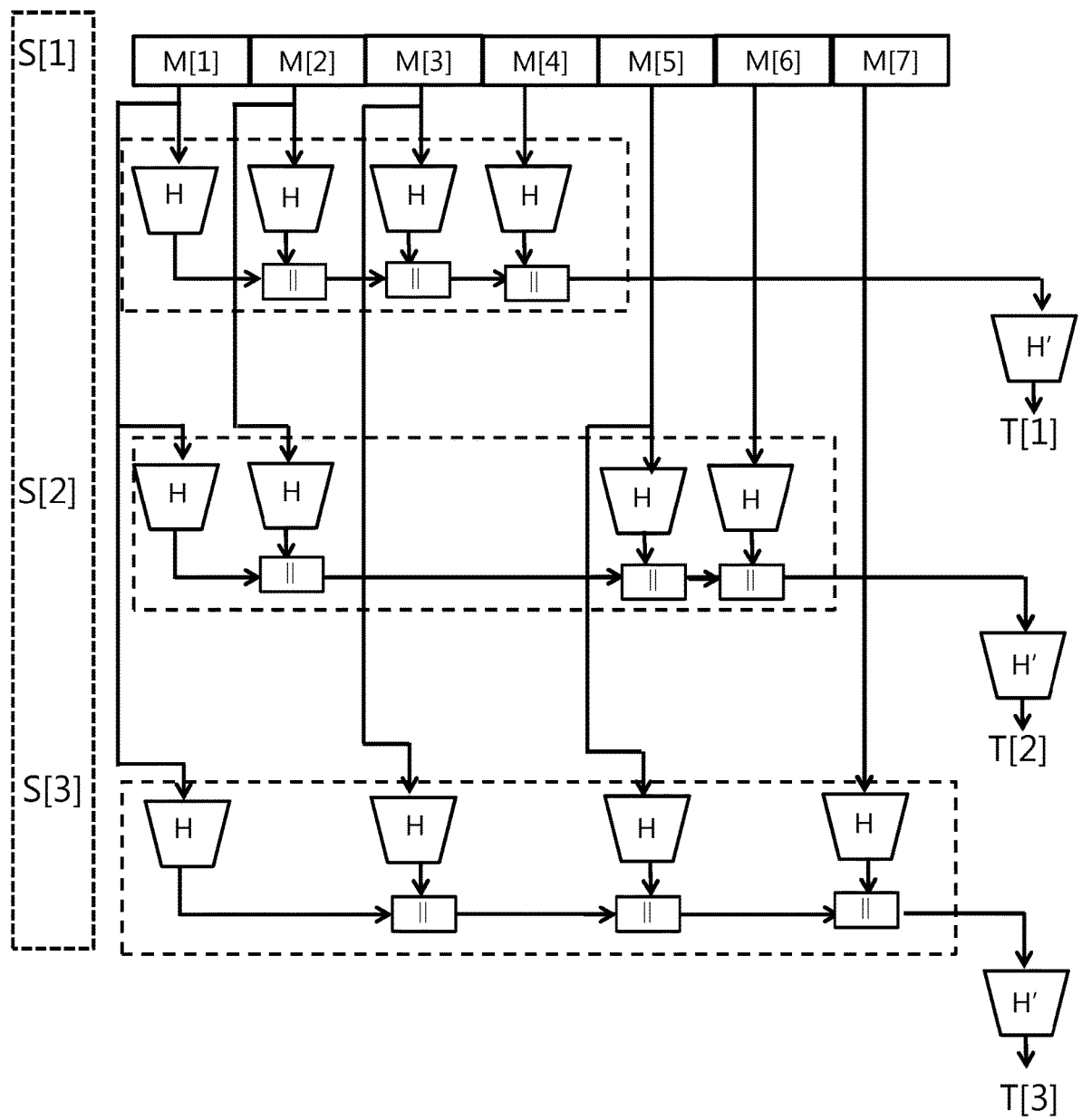
FIG. 1 is a diagram illustrating a related art.
Figure 2:
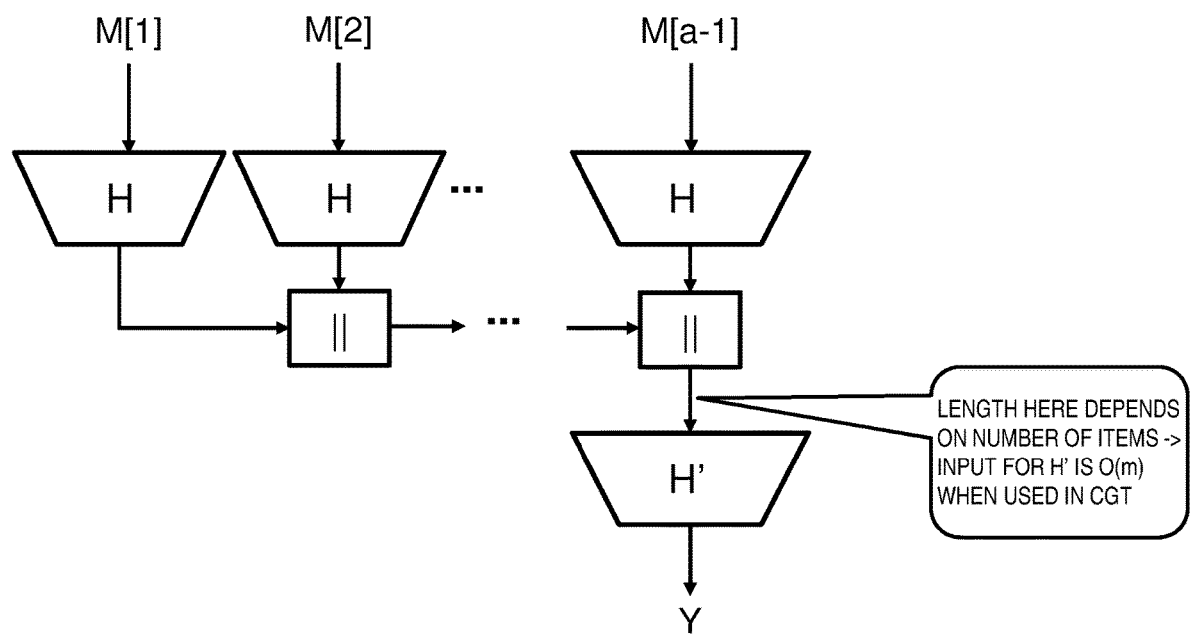
FIG. 2 is a diagram illustrating a related art.
Figure 3:
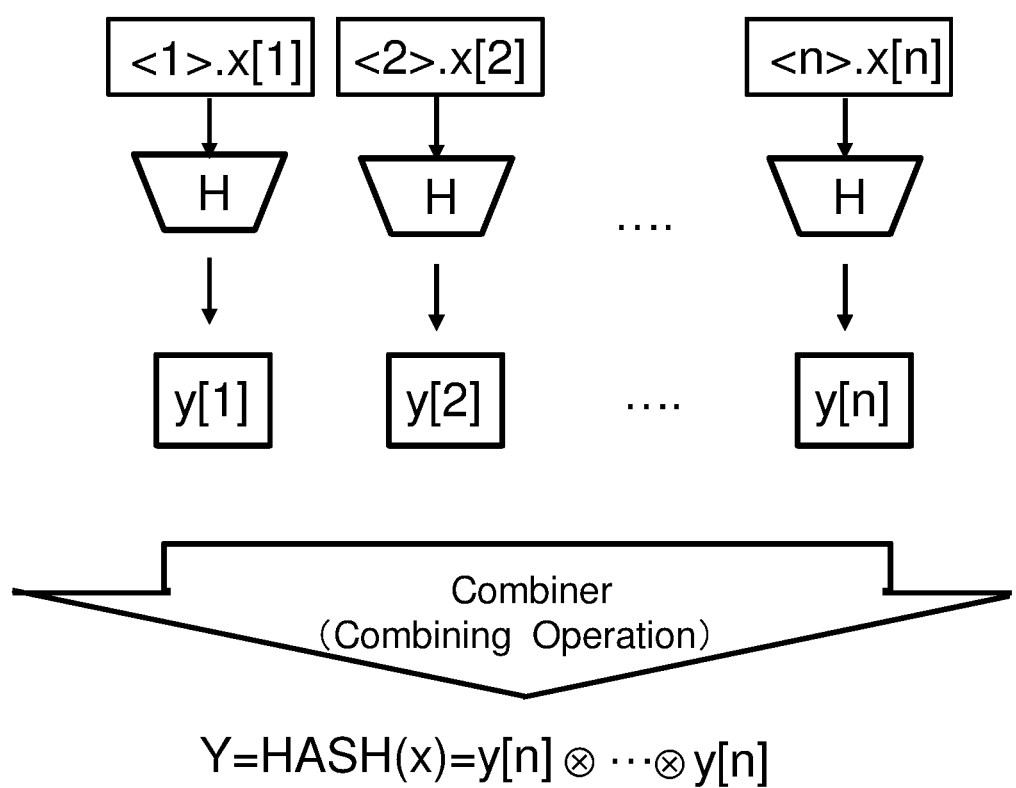
FIG. 3 is a diagram illustrating an aspect of the present invention.

Example embodiments of the present invention will be described. First, a basic concept will be described. FIG. 3 is a diagram illustrating an aspect of the present invention. An input message is divided into blocks, and a hash function H( ) is applied individually to each of the block. The hash function H( ) may be SHA-2 or the like, for example.

When a message X is composed of n concatenated blocks (items) x[1], . . . , x[n] (X=x[1], . . . , x[n]), the hash function H( ) is applied to each augmented block <i>.x[i] which is obtained by concatenating an individual block index (item index) i=1, . . . n, to each x[i] (i=1, . . . , n).

$$<i>.x[i] \quad (11)$$

$$y[i]=H(<i>.x[i]) \ (i=1,\ldots,n) \quad (12)$$

A combining operation for n hash values y[i] (i=1, . . . , n) is performed, as expressed by the following expression:

$$Y=\text{HASH}(X)=y[1]\otimes,\ldots,\otimes y[n] \quad (13)$$

Hash values y[1], . . . , y[n] may constitute elements of a group G with respect to an operation $\otimes$.

Arbitrary two elements a and b that belong to the G closed under a binary operation. That is, with respect to $\forall a, b \in G$, $$a \otimes b \text{ and } b \otimes a \quad (14\text{-}1)$$

are included in the G.

The following associativity law holds with respect to three elements a, b, and c of the group G:

$$(a \otimes b) \otimes c = a \otimes (b \otimes c) \quad (14\text{-}2)$$

When the expressions (14-1) and (14-2) are satisfied, the G constitutes a semigroup with respect to a binary operation $\otimes$.

An identity element e is included in the group G, so that the following expression holds:

$$a \otimes e = e \otimes a = a \quad (14\text{-}3)$$

When the expressions (14-1) to (14-3) are satisfied, the G constitutes a monoid with respect to the operation $\otimes$.

An inverse element $a^{-1}$ is present for any element a that belongs to the group G, and the following expression holds:

$$a \otimes a^{-1} = a^{-1} \otimes a = e \quad (14\text{-}4)$$

where e is an identity element.

When expressions (14-1) to (14-4) are satisfied, the G constitutes a group with respect to the binary operation $\otimes$.

A combiner combines a hash value of an element of the group G via the operation $\otimes$.

It is assumed that the hash function H( ) is an incremental hash function and a hash value Y=HASH(X) is already computed with respect to X=x[1], . . . , x[n]. When a block x[i] is changed to x'[i] (i=1, . . . , n), a new hash value is given by the following expression (15). The expression (15) indicates incrementality.

$$HASH(X')=Y \otimes H(<i>.x[i])^{-1} \otimes H(<i>.x'[i]) \quad (15)$$

Non Patent Literature 5 assumes that a hash function HASH ( ) is ideal, that is, a random oracle.

As an example of the combining operation by the combiner, MuHASH is given by the following expression, for example:

$$MuHASH_{G,H}(x[1], \ldots, x[n])=\Pi<i=1,n>H(<i>.x[i]) \quad (16)$$

MuHASH uses integer multiplication modulo p in a group whose order is a prime number p. That is, a block is randomized by H to obtain $Z_p^*=Zp-\{0\}=\{1, 2, \ldots, p-1\}$, and the integer multiplication modulo p is performed on these obtained results. It is known that security of MuHASH against a collision attack can come to difficulty of a discrete log problem (discrete log problem) in the group G, for example.

AdHasH uses addition modulo a k-bit integer M (mod M), and is given by the following expression:

$$AdHASH_{M,H}(x[1], \ldots, x[n])=\Sigma<i=1,n>H(<i>.xi)$$
$$\mod M \quad (17)$$

It is known that when the integer M composed of k bits and q numbers of 0<a[1], . . . , a[q]<M are given, security of AdHASH is related to (k-q)-weight knapsack problem of finding q weights w=(w[1], . . . , w[q]), each of which is in {-1, 0, +1}) and which are not all zero, such that $$\Sigma<i=1,q>w[i]a[i]=0(\mod M) \quad (18)$$

As long as the weight knapsack problem is difficult, the hash function is collision-free.

Further, it is known that the security of hash function comes to a problem of finding w=(w[1], . . . , w[q]), (w[i] (i=1, . . . , q)∈{-1, 0, +1} that satisfy the following expression, with respect to the operation in the group G:

$$a[1]^{w[1]} \otimes a[2]^{w[2]} \otimes, \ldots, \otimes a[n]^{w[n]}=e \quad (19)$$

This relates to a balance problem of finding disjoint subsets (disjoint subsets) which are expressed as follows and having no overlap to satisfy the following expression when the elements a[1], . . . a[n] of the group G are given:

$$\oplus_{i \in I} a[i] = \oplus_{j \in J} a[j] \quad (20)$$

$$I, J \subseteq \{1, \ldots, n\}, I \cap J = \phi \quad (21)$$

LtHASH uses vector addition and an output is set to $Z_p^k$ by setting the modulo M of AdHASH to a prime number p.

$$LtHASHp, h(x1, \ldots, xn)=\Sigma i \; h(<i>.xi) \mod p \quad (22)$$

Figure 4:
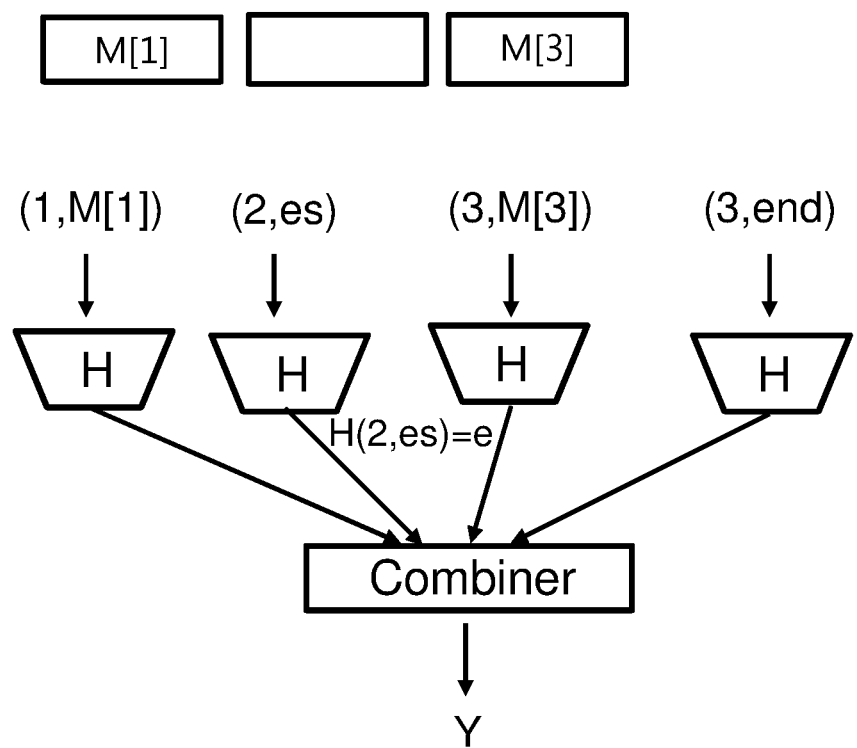
FIG. 4 is a diagram illustrating an aspect of the present invention.

FIG. 4 is a diagram describing a hash value computation for a partial string S[1]=(M[1], M[2], M[3], M[4]) when a message is composed of seven items, like the above-mentioned message M=(M[1], . . . , M[7]).

(i, M[i]) indicates an item in which an item index i and an item M[i] are concatenated (that may be referred to as an augmented item corresponding to an augmented block). According to the notation in FIG. 3, (i, M[i]) is indicated by:

$$<i>.M[i] \quad (23)$$

In case of MuHASH, the output of the combiner is, for example, expressed by:

$$Y=\Pi<i=1,4>H(i,M[i]) \quad (24)$$

As illustrated as (2, es) in FIG. 4, an empty string es with a length 0 is introduced for an item M[2] (empty item) that is not used for a test, out of partial strings obtained by division according to a group testing matrix. That is, a block space is augmented from the group G to the following:

$$G' = G \cup \{es\} \quad (25)$$

It is noted that collision resistance of operation on the group G' is a security requirement.

With respect to the empty string, (x[1]) and (x[1], es) are different elements.

Further, (es, es) and (es) are also different elements.

In the combining operation of hash values by the combiner, a hash value of (i, es) is treated as an identity element of the group G' irrespective of an index i of an item in the partial string.

$$H(i,es)=e \quad (26)$$

In MUHASH, an identity element is: e=1,

In AdHash, an identity element becomes e=0, and

In LtHASH, an identity element becomes e=(0, . . . , 0).

Referring to FIG. 4, when the partial string terminates in n items, a hash value H (n, end) of (n, end) is input to the combiner (combiner). Herein, "end" is assumed to be a reserved word that is different from es or non-es and determined in advance. (n, end) is a concatenation of an item index n and a reserved word end.

First Example Embodiment

Figure 5:
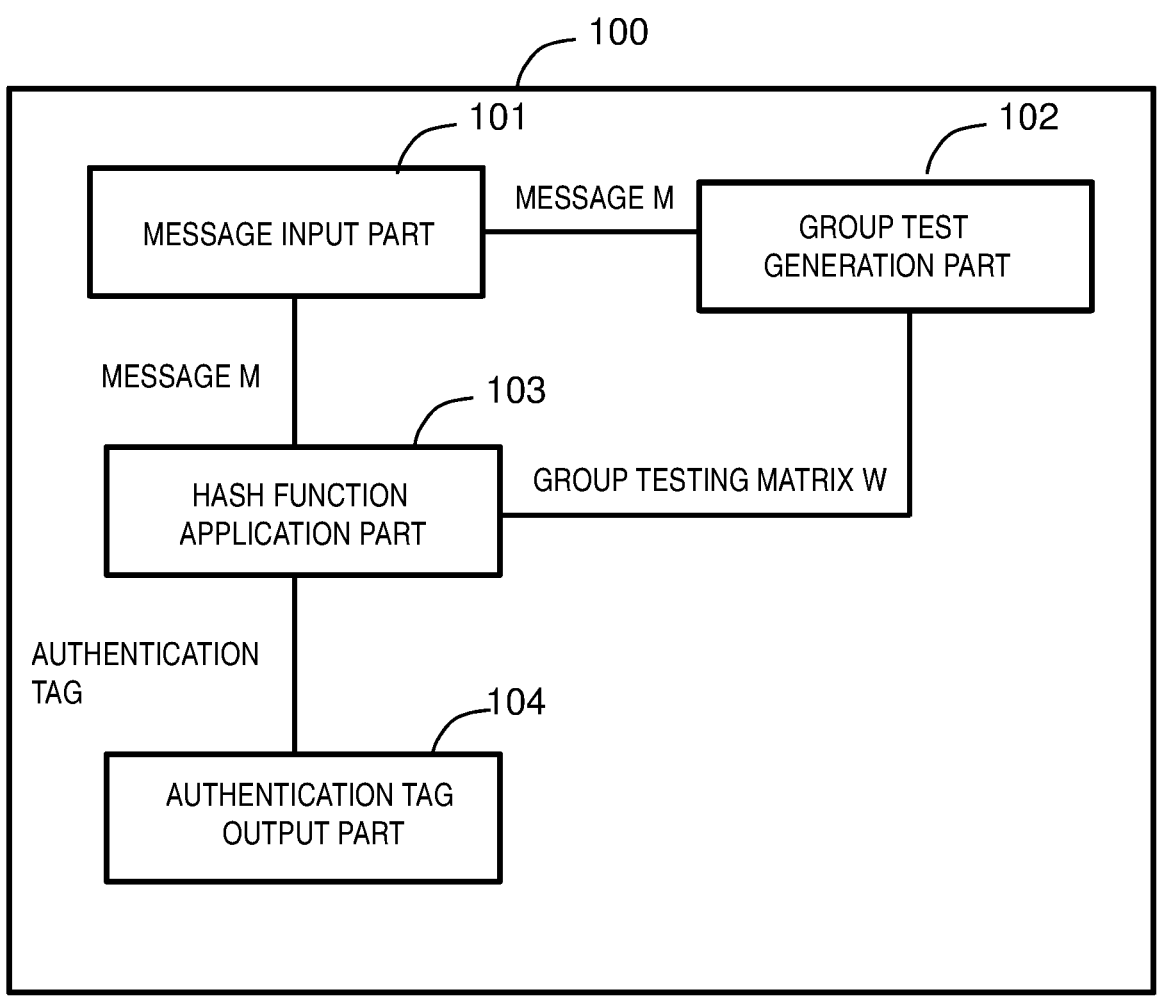
FIG. 5 is a diagram illustrating an example first example embodiment of the present invention.

FIG. 5 is a diagram describing an example first example embodiment of the present invention. FIG. 5 schematically illustrates an example of a configuration of an authentication tag generation apparatus 100. Referring to FIG. 5, the authentication tag generation apparatus 100 includes a message input part 101, a group test generation part 102, a hash function application part 103, and an authentication tag output part 104.

The message input part 101 may be configured to include a hardware interface and software configured to receive a target message M. Though not limited thereto, the message input part 101 may be configured to include a character input apparatus such as a keyboard, a disk interface (controller/driver) configured to read data or a file from a hard disk drive apparatus (HDD), or a solid state drive (solid state drive, SSD), and a apparatus to receive, from a memory apparatus, a network interface, or the like, a communication message to be transmitted to a destination node, for example.

It is assumed herein that the message M is composed of m (>1) individual items M[1], . . . , M[m]. The items may respectively have lengths (variable lengths) that are mutually different, or a same length. Though not limited thereto, content of each sector (such as 512 bytes, 4K (kilo=1024) bytes) of the HDD (Hard Disk Drive), one entry that is the minimum unit of a database, several bits, several bytes, several words, or one or more characters of text information (such as one character) may be set as each item.

The group test generation part 102 generates combinatorial group tests (CGTs) for identifying an altered position. The group test generation part 102 generates a binary group testing matrix W of s rows and m columns (m corresponding to the number of items), according to the number of tests s and a maximum value d of the number of altered items that can be identified.

It is assumed herein that, as an example, the group test generation part 102 has output the following binary 3×7 matrix as the group testing matrix W indicating the combinatorial group tests (CGT) when s=3 and d=1 with respect to the message M (M[1], M[2], . . . , M[7]).

$$W = \begin{bmatrix} 1 & 1 & 1 & 1 & 0 & 0 & 0 \\ 1 & 1 & 0 & 0 & 1 & 1 & 0 \\ 1 & 0 & 1 & 0 & 1 & 0 & 1 \end{bmatrix} \qquad (27)$$

The group testing matrix W, as expressed by the expression (27), indicates that when a value of a jth column in an ith row is "1", an item M[j] is used for an ith test, and the item M[j] is not used for the ith test when the value of the jth column in the ith row is "0".

For example, a row vector [1, 1, 1, 1, 0, 0, 0] in the first row of the group testing matrix W in the expression (27) indicates that a total of four items which are the items M[1], M[2], M[3], and M[4] are to be used for the first test. Further, a row vector [1, 1, 0, 0, 1, 1, 0] in the second row of the group testing matrix W in the expression (27) indicates that a total of four items which are the items M[1], M[2], M[5], and M[6] are to be used for the second test. As mentioned above, the role of the group testing matrix W is to indicate which item in the message is to be used for computation of a tag associated with each test, according to the value of each element.

An arbitrary existing method can be used as a method of generating the group testing matrix or a method of determining a partial string to be used in each group test. The group test generation part 102 may generate the group testing matrix W by using the method disclosed in each of Non Patent Literatures 1 to 4, for example.

It may be so configured that when each item is set to a sector of the HDD, the message M is set to a cluster (such as 8 sectors) which is a minimum capacity to be assigned to a file or a directory, and the s and the d are set to be fixed, the binary matrix W obtained by the group test generation part 102 is supplied, is stored, and is held in the authentication tag generation apparatus 100.

As illustrated in FIG. 4, the hash function application part 103 decomposes the message M into partial strings (where the number of items=m, and the number of the partial strings=s), according to the group testing matrix W, computes a hash function for each item of individual partial strings, and performs a combining operation of hash values to generate an authentication tag.

The authentication tag output part 104 receives authentication tags T[1], T[2], and T[3], and outputs an authentication tag list TL=[T[1], T[2], T[3]]. The authentication tag output part 104 may output the authentication tag list to a display apparatus, a printer apparatus, a file apparatus, a predetermined network node (such as a database or a management server) or the like, for example.

Figure 6:
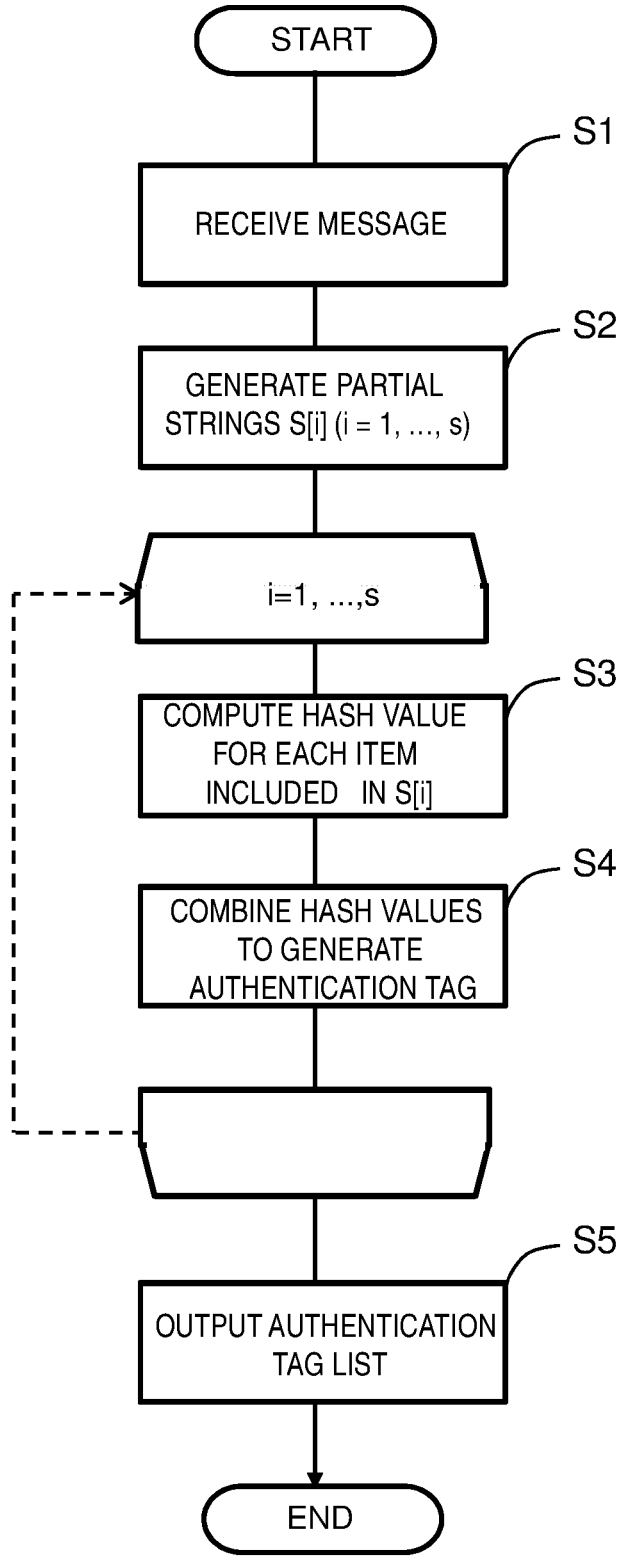
FIG. 6 is a flow diagram illustrating operations of the example first example embodiment of the present invention.

FIG. 6 is a flow diagram illustrating operation of the authentication tag list generation apparatus 100 in the example first example embodiment of the present invention.

The message input part 101 receives a message M (step S1).

The hash function application part 103 decomposes the message M into the partial strings (where the number of the items=m, and the number of the partial strings=s) according to the group testing matrix W (step S2).

The hash function application part 103 computes a hash function for each item of individual partial strings (step S3), performs the combining operation of hash values to generate the authentication tag (step S4).

The authentication tag output part 104 outputs the authentication tag list composed of s authentication tag lists.

FIG. 7 is a diagram illustrating the hash function application part 103 in FIG. 5. As described above, an empty string es with a length of 0 is introduced in this example embodiment. The hash value of (i, es) is treated by a combiner as an identity element of a group G irrespective of an index i of an item in the partial string.

In the present example embodiment, when each partial string terminates in n items, a hash value H((n, end)) of (n, end) adjacent to the hash values of the n items may be supplied to the combiner. It is assumed that "end" is a reserved word which is different from es or a non-es. (n, end) indicates a concatenation of an item index n and the reserved word of end.

The hash function application part 103 decomposes the message M (M[1], M[2], . . . , M[7]) into the following partial strings, according to the group testing matrix W in the expression (27). In this case, an alternation of d=1 item can be identified.

$$S[1]=(M[1],M[2],M[3],M[4]);$$

$$S[2]=(M[1],M[2],M[5],M[6]);$$

$$S[3]=(M[1],M[3],M[5],M[7]); \qquad (28)$$

Figure 7A:
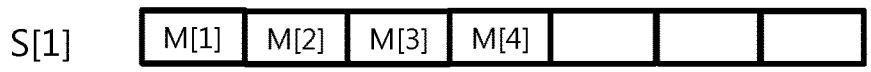
FIGS. 7A to 7C are diagrams for explaining the example first example embodiment of the present invention.
Figure 7A:
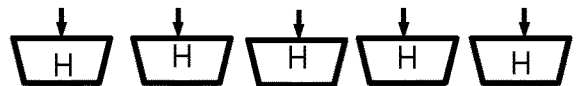

Referring to FIG. 7A, the hash function application part 103 computes hash values H(1, M[1]), H(2, M[2]), H (3, M[3]), H(4, M[4]) of respective items (augmented items each of which is obtained by concatenating an item index) in a partial string S[1]=(M[1], M[2], M[3], H(4, M[4]) and a hash value H(4, end) which is obtained by concatenating an item index 4 at the end of the partial string S[1] and the reserved word (end). Then, a first combiner (combiner 1) performs a combining operation of the hash values H(1, M[1]), H(2, M[2]), H(3, M[3]), H(4, M[4]), and H(4, end) of individual items of the partial string S[1] to generate an authentication tag T[1].

Figure 7B:
Figure 7B:
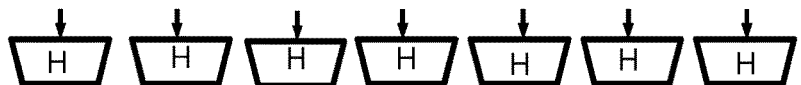

Referring to FIG. 7B, the hash function application part 103 computes hash values H(5, M[5]) and H(6, M[6]) of respective items of items M[5] and M[6] (augmented items each obtained by concatenating an item index) in a partial string S[2]=(M[1], M[2], M[5], M[6]). As the hash value H(1, M[1]) of the item M[1] and the hash value H(2, M[2]) of the item M[2], the values that have been computed in the process for the partial string S[1] are used. The hash function application part 103 computes H(3, es) and H(4, es) of the item M[3] and the item M[4] that are empty (are not used for the test) in the partial string S[2], and a hash value H(6, end) of (6, end) obtained by concatenating an item index 6 at the end of the partial string S[2] and the reserved word (end). Then, a second combiner (combiner 2) performs a combining operation of the hash values H(1, M[1]), H(2, M[2]), H(3, es), H(4, es), H(5, M[5]), H(6, M[6]), and H(6, end) of the respective items (to which the item indices have been concatenated) in the S[2], thereby generating an authentication tag T[2].

Figure 7C:
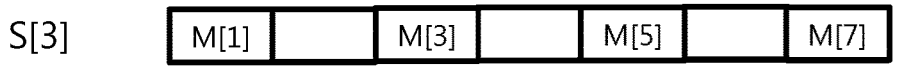
Figure 7C:

Referring to FIG. 7C, the hash function application part 103 computes a hash value H(7, M[7]) of an item (augmented item obtained by concatenating an item index) M[7] in a partial string S[3]=(M[1], M[3], M[5], M[7]). As the hash values H(1, M[1]), H(3, M[3]) and H(5, M[5]) of the items M[1], M[3], and M[5], the values that have been computed are used. Further, the hash function application part 103 computes H(2, es), H(4, es), and H(6, es) of the items M[2], M[4], and M[6] that are empty (are not used for the test) in the partial string S[3], and a hash value H(7, end)

of (7, end) obtained by concatenating an item index 7 at the end of the partial string S[3] and the reserved word (end). Then, a third combiner (combiner 3) performs a combining operation of the hash functions H(1, M[1]), H(2, es), H(3, M[3]), H(4, es), H(5, M[5]), H(6, es), H(7, M[7]), and H(7, end) of the respective items (to which the item numbers have been concatenated) in the S[3], thereby computing an authentication tag T[3]. A configuration is possible in which H(7, end) is not added for the number of the items m=7 in the partial string.

In the example of FIG. 7A, a hash value (identity element e) of an empty string es for each of the items M[5], M[6], and M[7] that are empty (are not used for the test) after the ending item M[4] of the partial string S[1] is not supplied to the first combiner (combiner 1).

In the example of FIG. 7B, the hash value (identity element e) of the empty string es for the item M[7] that is empty (is not used for the test) after the ending item M[6] of the partial string S[2] is not supplied to the second combiner (combiner 2). The hash values of the empty strings es ((3, es), (4, es)) for the empty items M[3] and M[4] are supplied to the second combiner (combiner 2).

In the diagrams of FIGS. 7A to 7C, a hash function H( ) using an empty string (i, es) as an input is illustrated, in association with an empty item, for simplicity of explanation. Since the hash value of (i, es) becomes an identity element e of a group G'=G∪{es} with respect to the combining operation, the operation process for the hash value of (i, es) is equivalent to skipping of the hash computation of the empty item {es}.

Figure 8A:
FIGS. 8A to 8C are diagrams for explaining the example first example embodiment (comparative example) of the present invention.
Figure 8A:
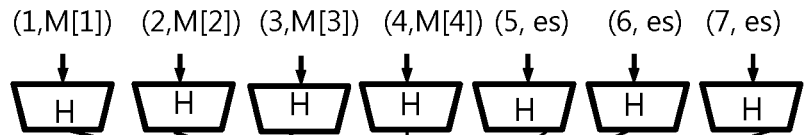
Figure 8A:
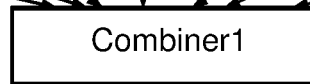
Figure 8A:
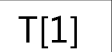
Figure 8B:
Figure 8B:
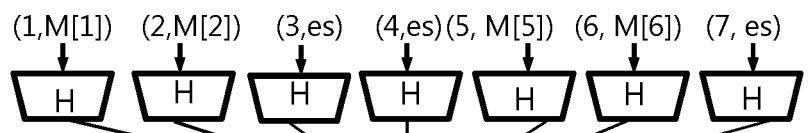
Figure 8B:
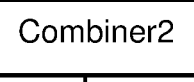
Figure 8B:
Figure 8C:
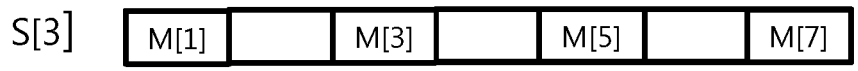
Figure 8C:
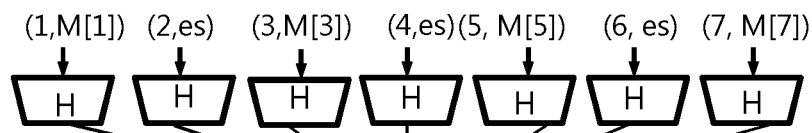
Figure 8C:
Figure 8C:

FIGS. 8A to 8C are diagrams each describing an example in which, when each partial string terminates in the n items in the first example embodiment in FIG. 5, the hash value H (n, end) of (n, end) obtained by concatenating the item index n and the reserved word (end) is not added.

Referring to FIG. 8A, a hash function for each item of (1, M[1]), (2, M[2]), (3, M[3]), (4, M[4]), (5, es), (6, es), (7, es) in the partial string S[1] is computed and a combining operation is applied to compute an authentication tag T[1].

Referring to FIG. 8B, a hash function for each item of (1, M[1]), (2, M[2]), (3, es), (4, es), (5, M[5]), (6, M[6]), (7, es) in the partial string S[2] is computed, a combining operation is applied to compute an authentication tag T[2].

Referring to FIG. 8C, a hash function for each item of (1, M[1]), (2, es), (3, M[3]), (4, es), (5, M[5]), (6, es), (7, M[7]) in the partial string S[3] is computed and a combining operation is applied to compute an authentication tag T[3].

In FIGS. 8A, 8B, and 8C, as mentioned above, when each partial string terminates in the n items, there is not a hash function H (n, end) of the reserved word indicating the end. Therefore, in the case of the diagrams in FIGS. 8A, 8B, and 8C, a self-evident length extension attack become possible. That is, each authentication tag is vulnerable to the length extension attack. The length extension attack is an attack which uses a property that, regarding an iteration type hash function H, H(M∥M') can be computed just from H(M) and M'. It is noted that M∥M' indicates a concatenation of M and M'.

Figure 9A:
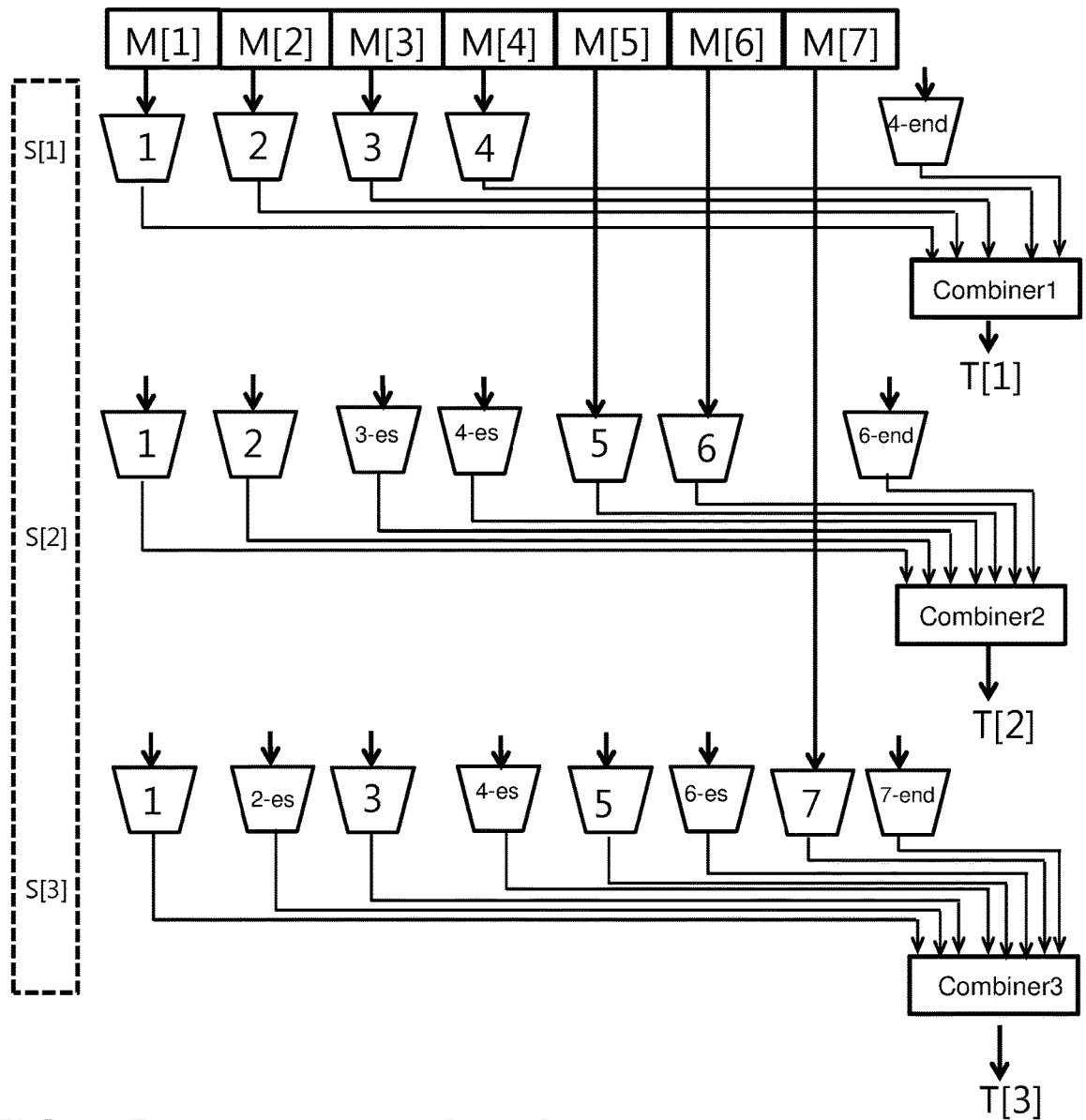
FIGS. 9A to 9D are diagrams for explaining the example first example embodiment of the present invention.
Figure 9B:
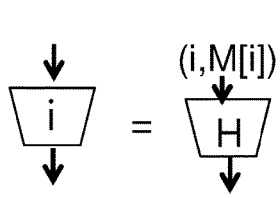
Figure 9C:
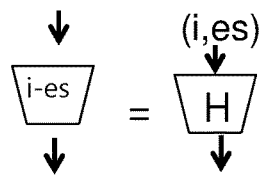
Figure 9D:
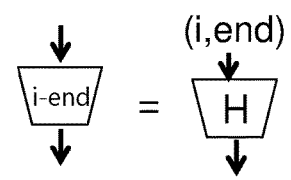

FIG. 9A is a diagram in which FIG. 7A to FIG. 7C described above are integrated into one diagram. Referring to FIGS. 9A, 9B, 9C, and 9D, FIGS. 9B to 9D are explanatory diagrams about notations of the hash function in FIG. 9A.

Variation Example 1

Figure 10:
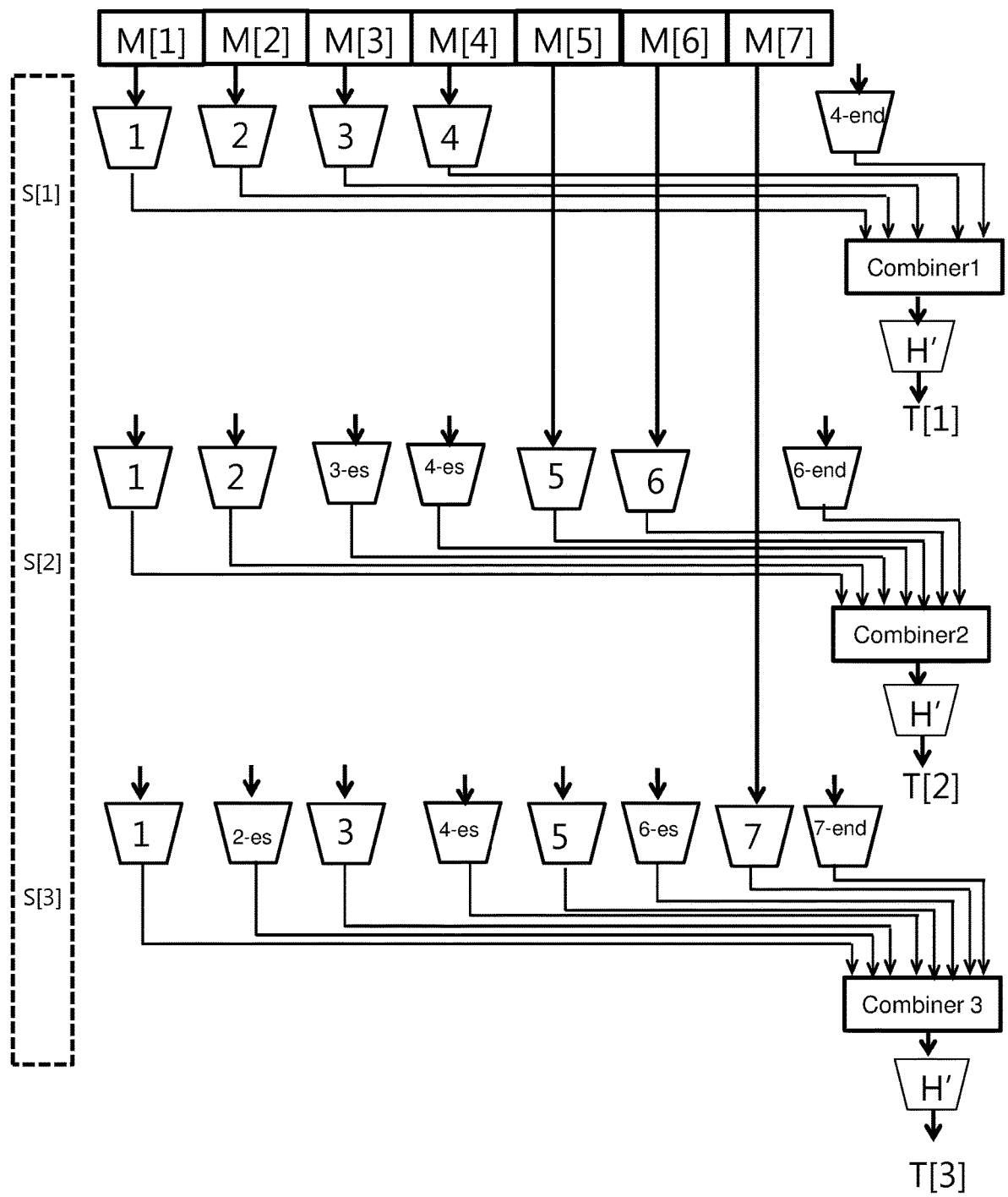
FIG. 10 is a diagram illustrating a variation example of the example first example embodiment of the present invention.

FIG. 10 is a diagram illustrating a variation example 1 of FIGS. 9A, 9B, 9C, and 9D. An output of the hash function may significantly become larger than a MAC (Message Authentication Code: MAC) when security in the same level as in the MAC is to be ensured. To take an example, an output of MuHash is 3000 bits, and an output of the MAC is of an order of 128 bits, for example.

When a cryptographic hash function such as an elliptic curve is used, for example, an output bit width of the hash function is small, but a calculation cost in the combiners is increased.

Output bits of each combiner is reduced to predetermined bits, or output n hash values of each of the combiners (combiners 1 to 3) using a hash function H'( ) are used for each of authentication tags T[1] to T[3]. It may be configured that when an output of each of the combiners (combiners 1 to 3) is 2K bits to 4K bits in the example in FIG. 10, the output may be compressed to for example, 256 to 512 bits using the hash function H'( ).

Variation Example 2

Figure 11:
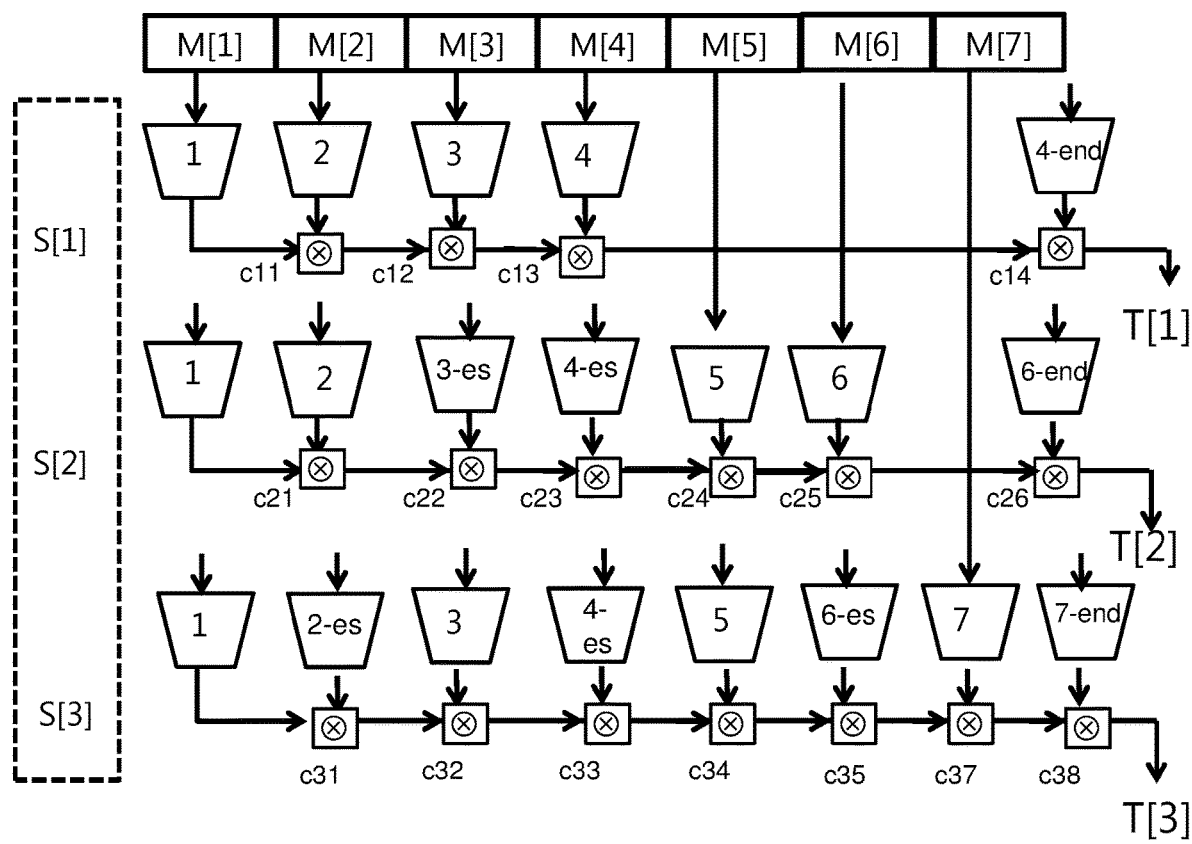
FIG. 11 is a diagram illustrating a variation example of the example first example embodiment of the present invention.

In the above-mentioned example embodiment, a routine of generating a MAC tag list, for example, can be used. FIG. 11 is a diagram illustrating a scheme where the example embodiment has been applied to the routine of generating the MAC tag list disclosed in Patent Literature 2 or the like, for example.

A two-input combiner C11 performs the operation on two hash values H(1, M[1]) and H(2, M[2]).

$$Y1 = H(1,M[1]) \otimes H(2,M[2]) \quad (29)$$

A two-input combiner C12, performs the operation on the Y1 and a hash function H(3, M[3]). A result of the operation is given as follows:

$$Y2 = Y1 \otimes H(3,M[3]) = (H(1,M[1]) \otimes H(2,M[2])) \otimes H(3,M[3]) = H(1,M[1]) \otimes H(2,M[2]) \otimes H(3,M[3]) \quad (30)$$

An output of a two-input combiner C13 is given as follows:

$$Y3 = Y2 \otimes H(4,M[4]) = (H(1,M[1]) \otimes H(2,M[2]) \otimes H(3,M[3])) \otimes H(4,M[4]) \quad (31)$$

An output Y4 of a two-input combiner C14 is given as follows:

$$Y4 = Y3 \otimes H(4,end) = H(1,M[1]) \otimes H(2,M[2]) \otimes H(3,M[3]) \otimes H(4,M[4]) \otimes H(4,end) \quad (32)$$

The output Y4 of the combiner C14 becomes an authentication tag T[1] of a partial string S[1]. Similar operations are performed for each of the partial strings S[2] and S[3].

In this example embodiment, proof of security of the hash function based on the CGT can take over the result of Non Patent Literature 5 substantially as it is. That is, security evaluation of the existing incremental hash can be used substantially without alteration. The collision-finding probability of CGT hash (block input space G'=G ∪{es}) becomes less than or equal to (less than) a probability of solving a balance problem on the group G.

Further, by using the incremental hash, a cost of updating data that once gets hashed can be reduced.

A hash function H( ) in this example embodiment for computing a hash value to be input to each combiner is not, however, limited to the incremental hash function having incrementality (in expression (15)) that assumes existence of an inverse element, and may constitute, for example, an element of a monoid G that does not presuppose existence of an inverse element.

A hash function having homomorphism, for example, may be used. Homomorphism means that with respect to ∀a, b∈X, mapping f: X→Y' satisfies the following expression:

$$f(a \bullet b) = f(a) \bullet f(b) \quad (33)$$

This corresponds to a case where, with respect to the hash function H( ) the following expression holds:

$$H(a \bullet b) = H(a) \bullet H(b) \quad (34)$$

Herein, the operation • may be a modulo operation (addition or multiplication).

According to this example embodiment, if the data size of each item increases, an operation cost of each combiner is relatively reduced, so that the operation asymptotically approaches a speed of the hash function H( ) itself.

The speed of the operation in this example embodiment is considered to be higher than that of a simple combination of CGT and hash (if an amount of data is equal to or more than a certain amount).

Second Example Embodiment

Figure 12:
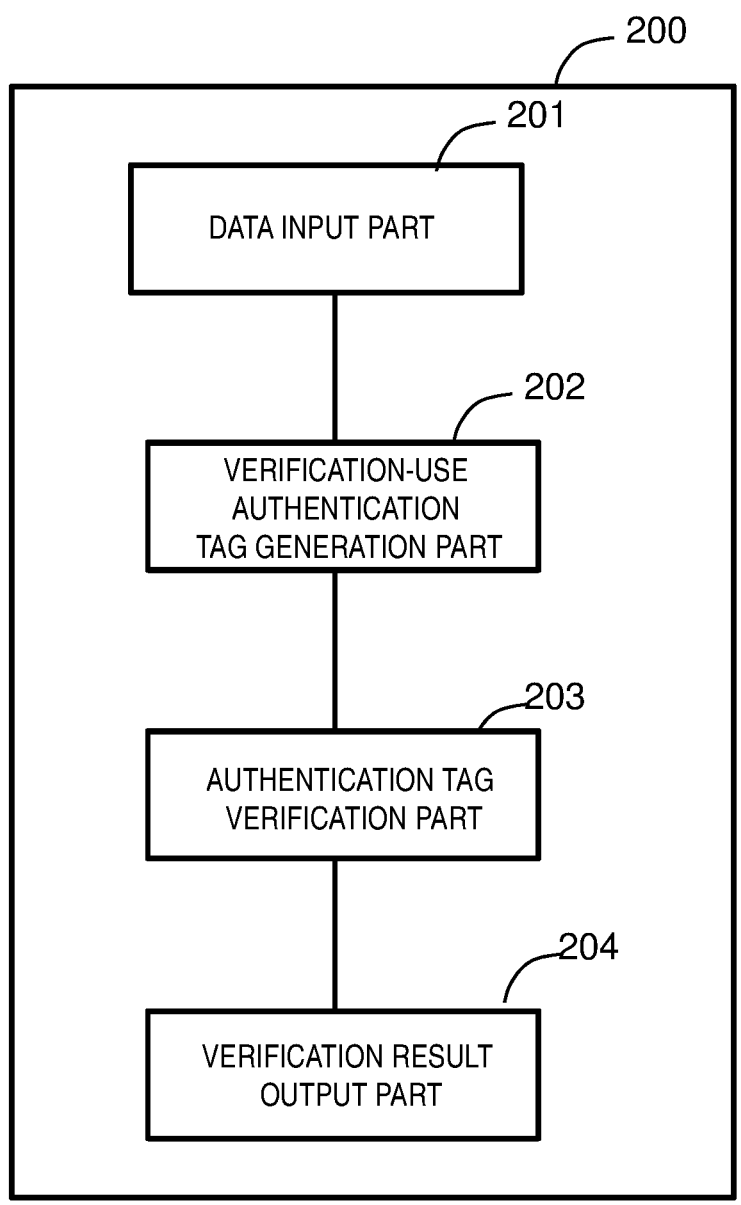
FIG. 12 is a diagram illustrating an example second example embodiment of the present invention.

FIG. 12 is a diagram illustrating an example second example embodiment of the present invention. FIG. 12 schematically illustrates an example of a configuration of an authentication tag verification apparatus 200. Referring to FIG. 12, the authentication tag verification apparatus 200 includes a data input part 201, a verification-use authentication tag generation part 202, an authentication tag verification part 203, and a verification result output part 204.

The data input part 201 receives a message M that is a target for alteration detection, an authentication tag list TL that has been already generated for the message M, and a group testing matrix (CGT matrix) W as information indicating partial strings for combinatorial group testing (CGT) that has been used for generation of the authentication tag list TL. The authentication tag list TL and the CGT matrix W received by the data input part 201 are the authentication tag list TL and the group testing matrix W that have been generated for the message M by the authentication tag generation apparatus 100 of the first example embodiment. The data input part 201 may be implemented by including an interface configured to receive the authentication tag list TL from a database, a management server, or the like, and a communication interface configured to receive, from the authentication tag generation apparatus 100, the message M received by the authentication tag generation apparatus 100.

Hereinafter, it is assumed that the message M is composed of m individual items, as in the first example embodiment. That is, it is assumed that M=(M[1], . . . , M[m]).

The verification-use authentication tag generation part 202 computes a hash function H( ) for an individual partial string of the message M targeted for the alteration detection, based on the received group testing matrix W, generates a value obtained by combining hash values, as a verification-use authentication tag, and generates a verification-use authentication tag list including s number of verification-use authentication tags. A manner of generating the verification-use authentication tags is the same as the process by the hash function application part 103 in the first example embodiment.

The authentication tag verification part 203 compares the received authentication tag list TL and the generated verification-use authentication tag list TL' to determine presence or absence of an alteration for the message M, and identifies or limits an altered position (an altered item in this example embodiment) when it has been determined that the alteration is present. The authentication tag verification part 203 outputs information indicating the presence or absence of the alteration and the altered position. The authentication tag verification part 203 may output an index for the altered item or the like, for example, as the information indicating the altered position. It may be so configured that when there is no alteration, the presence or the absence of the alteration is indicated by setting information indicating an altered position to an invalid value.

The authentication tag verification part 203 can determine the presence or the absence of the alteration and identify or limit the altered position in the following manner, for example. That is, a difference between respective entries (such as T[i] and T' [i], where i=1, . . . , s) is taken between the TL and the TL', and the following binary vector using an element b corresponding an index i of the entries, which assumes 0 when the difference is zero and assumes 1 when the difference is not zero, may be generated:

$$B = (b[1], \ldots, b[s]) \quad (35)$$

Then, a predetermined procedure (that is decoding, more specifically, processing of solving a solution in the group testing) is performed for the generated binary vector B, and a result of the predetermined procedure may be output.

The authentication tag verification part 203 may, for example, determine that there is no alteration when all the entries of the binary vector B are zero. Otherwise, the authentication tag verification part 203 may determine that there is an alteration in at least one item in the entirety of the message. In the latter case (when one of the entries is 1), the authentication tag verification part 203 may extract an ith raw vector (wi1, . . . , wik) of the received group testing matrix W with respect to every i (where i=1, . . . , s) that satisfies b [i]=0, and may determine that, with respect to each j that satisfies wij=1, M[j] is not altered. The authentication tag verification part 203 may perform the above described process to determine that alteration is present in every item other than those determined not to be altered.

The verification result output part 204 outputs information indicating a result of the verification by the authentication tag verification part 203, i.e., more specifically, the verification result output part 204 outputs information indicating presence or absence of an alteration and an altered position if there is an alteration. The verification result output part 204 may output the information indicating the result of the verification, for example, to a display apparatus, a printer apparatus, a predetermined network node (such as a database or a management server), or the like.

Figure 13:
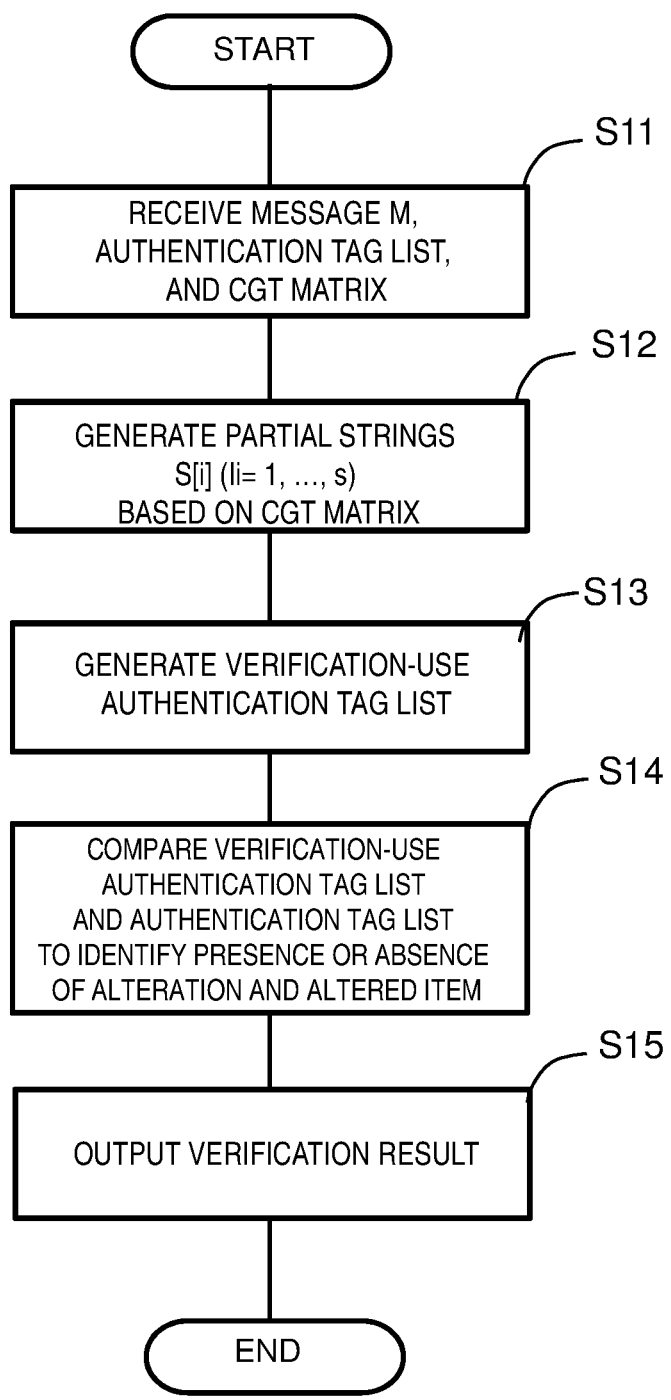
FIG. 13 is a flow diagram illustrating operations of the example second example embodiment of the present invention.

FIG. 13 is a flow diagram illustrating an example of operations of the authentication tag verification apparatus 200 in the second example embodiment described with reference to FIG. 12.

First, the data input part 201 receives a message M targeted for alteration detection, an authentication tag list TL that has been generated for the message M, and a group testing matrix W of s rows and m columns (step S11).

Then, the verification-use authentication tag generation part 202 generates (decomposes) s partial strings S[i] (i=1, . . . , s) from the message M, based on the received group testing matrix W (step S12).

Then, the verification-use authentication tag generation part 202 generates a verification-use authentication tag list TL'=(T'[1] . . . , T'[s]) composed of s verification-use authentication tags for the s partial strings S[i] (i=1, . . . , s) (step S13).

Then, the authentication tag verification part 203 compares the generated verification-use authentication tag list TL' and the authentication tag list TL received in step S11, and identifies presence or absence of an alteration and identifies an item that has been altered if the item has been altered, as a result of verification.

Finally, the verification result output part 204 outputs information indicating a result of the verification by the authentication tag verification part 203 (presence or absence of an alteration and a result of identification of an altered item) (step S15).

Third Example Embodiment

Figure 14:
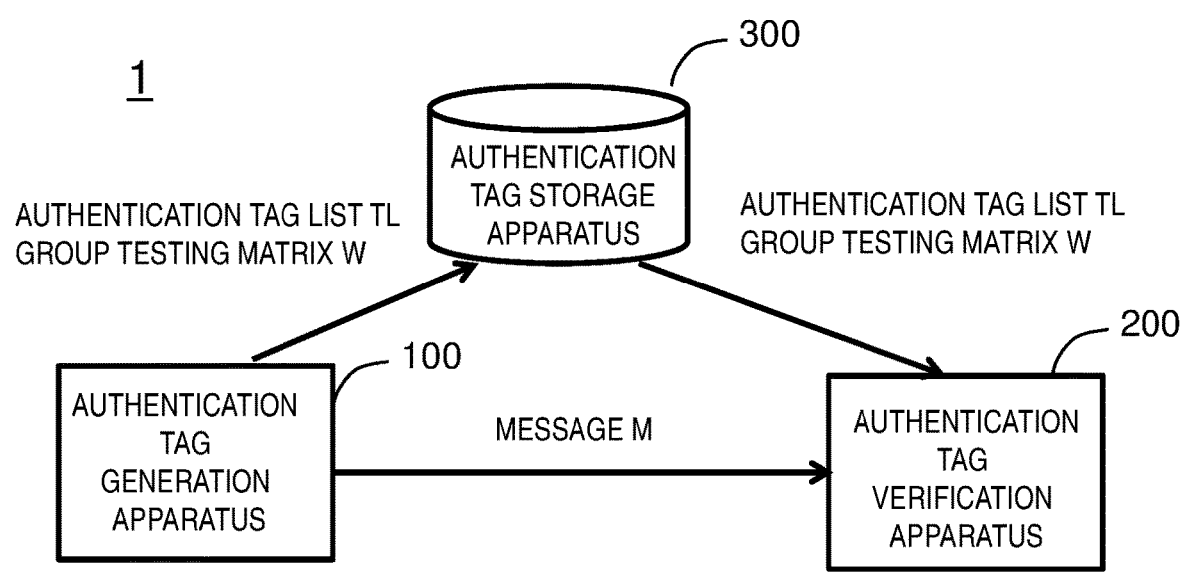
FIG. 14 is a diagram illustrating an example third example embodiment of the present invention.

FIG. 14 is a diagram illustrating an example of a configuration of a system in a third example embodiment of the present invention. Referring to FIG. 14, a data authentication system 1 in this example embodiment includes the authentication tag generation apparatus 100 in the first example embodiment and the authentication tag verification apparatus 200 in the second example embodiment that have been described above, and an authentication tag storage apparatus 300. Referring to FIG. 14, naturally, each of arrows among the authentication tag generation apparatus 100, the authentication tag storage apparatus 300, and the authentication tag verification apparatus 200 illustrates an example of data transmission/reception (between a transmission source and a destination), and does not mean that the communication among the authentication tag generation apparatus 100, the authentication tag storage apparatus 300, and the authentication tag verification apparatus 200 is not limited to one direction.

The authentication tag storage apparatus 300 stores an authentication tag list TL that has been generated by the authentication tag generation apparatus 100. The authentication tag storage apparatus 300 may store an identifier for a message M for which the authentication tag list TL has been generated and a group testing matrix W that has been used for the generation of the authentication tag list TL, together with the authentication tag list TL, for example. When a hash function with key is used as a hash function H( ) to be used for generation of an authentication tag, the authentication tag storage apparatus 300 may be omitted. In that case, the authentication tag list TL that has been generated by the authentication tag generation apparatus 100 may be transmitted to the authentication tag verification apparatus 200 or an arbitrary apparatus that is set to the destination of the message M, together with the message M.

It may be so configured that the authentication tag generation apparatus 100 and the authentication tag verification apparatus 200 are connected via a communication network or the like such as a LAN (Local Area Network) or a WAN (Wide Area Network), or may be implemented by being integrated in one unit. That is, one apparatus may include functions (respective means) of the authentication tag generation apparatus 100 and functions (respective means) of the authentication tag verification apparatus 200. In such a case, the hash function application part 103 can also generate a verification-use authentication tag in that apparatus. It is noted that in this case, the verification-use authentication tag generation part 202 of the authentication tag verification apparatus 200 can be omitted. Further, the authentication tag generation apparatus 100 and the authentication tag verification apparatus 200 may be referred to as a data authentication apparatus, with no particular distinction made between the authentication tag generation apparatus 100 and the authentication tag verification apparatus 200.

Fourth Example Embodiment

Figure 15:
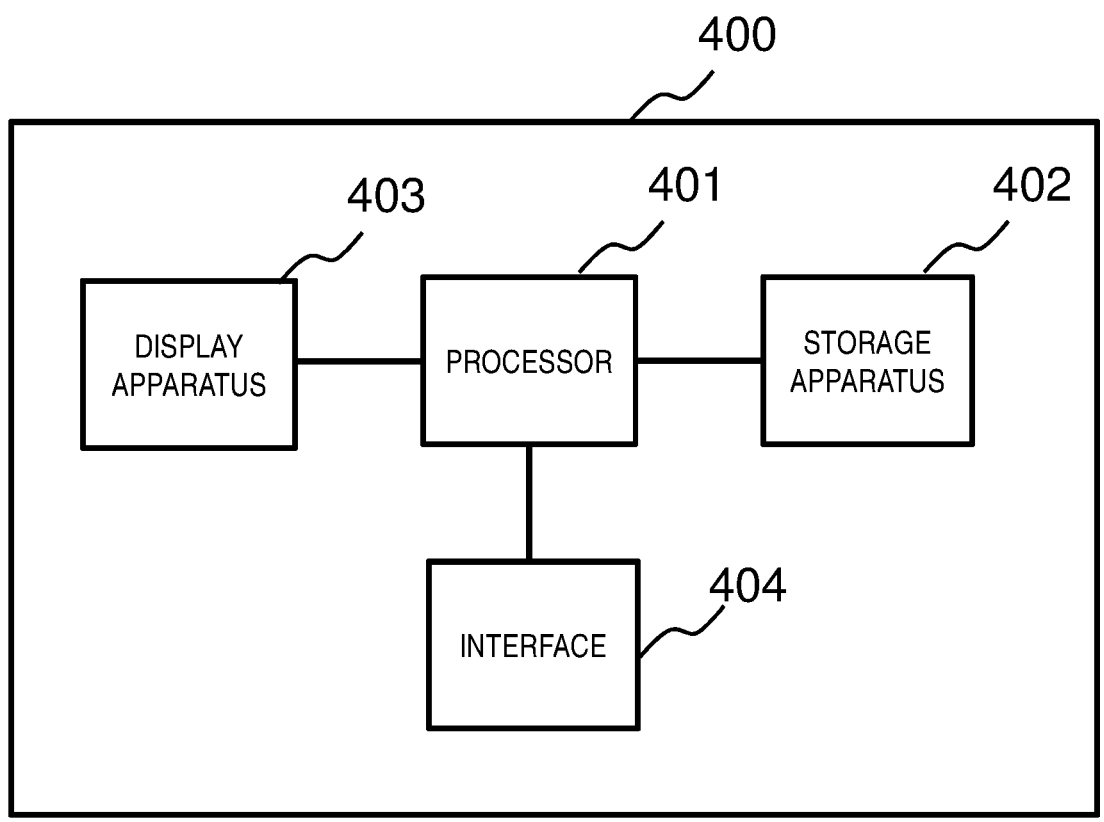
FIG. 15 is a diagram illustrating an example fourth example embodiment of the present invention.

As illustrated in FIG. 15, the authentication tag generation apparatus 100 in the first example embodiment and the authentication tag verification apparatus 200 in the second example embodiment may be individually or unitarily implemented in a computer system 400. Referring to FIG. 15, the computer system 400 includes a processor (CPU (central Processing Unit), or a data processing apparatus) 401, a storage apparatus 402 including at least one of a semiconductor memory (such as a RAM (Random Access Memory), a ROM (Read Only Memory) or an EEPROM (Electrically Erasable and Programmable ROM)), a USB (Universal Serial Bus) memory, an HDD (Hard Disk Drive), a CD (Compact Disc), a DVD (Digital Versatile Disc), and so on, a display apparatus 403, and an interface 404. By executing a program stored in the storage apparatus 402 by the processor 401, the function of at least one of the authentication tag generation apparatus 100 and the authentication tag verification apparatus 200 that have been described above may be implemented. The storage apparatus 402 may be used as the authentication tag storage apparatus 300 in FIG. 14. The interface 404 may be configured to include a network interface configured to transmit at least one of a message M, a group testing matrix W, an authentication tag list TL, and so on to a network node (such as a database or a management server) or to receive the at least one of the message M, the group testing matrix W, the authentication tag list TL, and so on from the network node.

The above-mentioned example embodiments each can be applied to an alteration detection system. To take an example, a computer system as a whole may be targeted, or each of the above-mentioned example embodiments may be used for alteration detection or the like by performing hash computation of a file or the like by an agent in a client PC (Personal Computer) and then by performing hash comparison by a server.

The above-mentioned example embodiments may be applied to application whitelisting (to permit use of only a good application to be used). To take an example, each of the above-mentioned example embodiments may be used when only a permitted file is executed by a CPU (Central Processing Unit), when a file is checked with a hash database generated in advance before execution of the file, or in an environment having a great attack risk (e.g., a POS (Point Of Sale) terminal or the like).

Alternatively, the above-mentioned example embodiments may be applied to a Web application firewall (Web Application Firewall: WAF) and may be used against alteration of a Web site and unauthorized access. Alternatively, it may be so configured, when white list management is performed, fine setting of an input character type for each parameter, an input pattern in regular expression, and so on is performed for each target URL (Uniform Resource Locator).

Alternatively, the above-mentioned example embodiments may be applied to software for log and trace management having a log alteration detection function implemented therein.

Alternatively, the above-mentioned example embodiments may be applied to a sensor network or the like. The number of MAC (Message Authentication Code) tag transmissions can be greatly reduced.

The number of hashes can be reduced in secure boot (configured to check whether a hash value is an expected value and stop start-up when the hash value is not the expected value).

Alternatively, the above-mentioned example embodiments may be applied to malware similarity determination or the like. The above-mentioned example embodiments may be applied to construction of an existing malware hash database.

Each disclosure of the above-listed Patent Literatures 1 and 2 and Non Patent Literatures 1 to 5 is incorporated herein by reference. Modification and adjustment of each example embodiment and each example are possible within the scope of the overall disclosure (including the claims) of the present invention and based on the technical concept of the present invention. Various combinations and selections of various disclosed elements (including each element in each claim, each element in each example, each element in each drawing, and the like) are possible within the scope of the claims of the present invention. That is, the present invention naturally includes various variations and modifications that could be made by those skilled in the art according to the overall disclosure including the claims and the technical concept.

The invention claimed is:

1. An authentication tag generation apparatus comprising:
a processor; and
a memory coupled to the processor and storing a program executable by the processor, wherein the processor is configured to
compute a hash function for each item included in a partial string obtained by dividing a message received according to a group testing matrix representing combinatorial group testing relating to the message, and
generate an authentication tag for the partial string, using a value obtained by a combining operation of individual hash values,
wherein the processor performs the combining operation of the individual hash values by using a hash value of an empty item as an identity element of the operation.

2. The authentication tag generation apparatus according to claim 1, wherein the processor is configured to generate, with respect to an item at an end of the partial string, a hash value for supply to the combining operation, the hash value obtained by computing the hash function for information indicating that an index of the item is an end of the partial string.

3. The authentication tag generation apparatus according to claim 1, wherein the processor is configured to set, as the authentication tag,
a value obtained by the combining operation of the individual hash values;
a value obtained by reducing a value obtained by the combining operation of the individual hash values to a predetermined bit width; or
a hash value obtained by computing a second hash function for the value obtained by the combining operation of the individual hash values.

4. The authentication tag generation apparatus according to claim 2, wherein the processor is configured to perform the combining operation of hash values obtained by computing the hash function for a concatenation of an index of the item and the item, and the hash function for a concatenation of an index of the item at the end of the partial string and a reserved word indicating the end of the partial string.

5. The authentication tag generation apparatus according to claim 1, wherein the hash function is an incremental hash function.

6. An authentication tag verification system comprising:
an authentication tag generation apparatus; and
an authentication tag verification apparatus,
wherein the authentication tag verification apparatus includes:
a second processor; and
a memory coupled to the second processor and storing a program executable by the second processor, wherein the second processor is configured to
receive a message to be verified, an authentication tag for each of partial strings obtained by division of the message according to a group testing matrix representing combinatorial group testing relating to the message, and the group testing matrix, as inputs, the authentication tag generated by the authentication tag generation apparatus for the message using the group testing matrix;
compute a hash function for each item included in each of partial strings obtained by division of the message according to the group testing matrix and generate a verification-use authentication tag for the partial string using a value obtained by a combining operation of individual hash values by a combiner, wherein the second processor performs the combining operation of the individual hash values by using a hash value of an empty item as an identity element of the operation;
compare the verification-use authentication tag generated by the verification-use authentication tag generation part and the authentication tag received by the data input part to perform verification as to whether an alteration is present; and
output a result of the verification by the authentication tag verification part.

7. The authentication tag verification system according to claim 6, wherein the second processor is configured to generate, with respect to an item at an end of the partial string, a hash value for supply to the combining operation, the hash value obtained by computing the hash function for information indicating that an index of the item is an end of the partial string.

8. The authentication tag verification system according to claim 6, wherein according to the received authentication tag, the second processor is configured to set, as the verification-use authentication tag,
a value obtained by the combining operation of the individual hash values by the combiner;
a value obtained by reducing a value obtained by the combining operation of the individual hash values by the combiner to a predetermined bit width; or
a hash value obtained by computing a second hash function for the value obtained by the combining operation of the individual hash values by the combiner.

9. The authentication tag verification system according to claim 6, wherein the second processor is configured to perform the combining operation of hash values obtained by computing the hash function for a concatenation of an index of the item and the item, and the hash function for a concatenation of an index of the item at the end of the partial string and a reserved word indicating the end of the partial string.

10. The authentication tag verification system according to claim 6, wherein the hash function is an incremental hash function.

11. An authentication tag generation method by a computer, the method comprising:
  computing a hash function for each item included in a partial string obtained by dividing a message received according to a group testing matrix representing combinatorial group testing relating to the message; and
  generating an authentication tag for the partial string, using a value obtained by a combining operation of individual hash values by a combiner, wherein the combiner performs the combining operation of the individual hash values by using a hash value of an item of an empty string as an identity element of the operation.

12. The authentication tag generation method according to claim 11, comprising:
  generating, with respect to an item at an end of the partial string, a hash value for supply to the combining operation by the combiner, the hash value obtained by computing the hash function for information indicating that an index of the item is an end of the partial string.

13. The authentication tag generation method according to claim 11, comprising:
  setting, as the authentication tag,
  a value obtained by the combining operation of the individual hash values by the combiner;
  a value obtained by reducing a value obtained by the combining operation of the individual hash values by the combiner to a predetermined bit width; or
  a hash value obtained by computing a second hash function for the value obtained by the combining operation of the individual hash values by the combiner.

14. An authentication tag verification method comprising:
  receiving a message to be verified, an authentication tag for each of partial strings obtained by division of the message according to a group testing matrix representing combinatorial group testing relating to the message, and the group testing matrix, as inputs, the authentication tag generated for the message using the group testing matrix;
  computing a hash function for each item included in each of partial strings obtained by division of the message according to the group testing matrix and generating a verification-use authentication tag for each of the partial strings using a value obtained by a combining operation of individual hash values by a combiner, wherein the combiner performs the combining operation of the individual hash values by using a hash value of an item of an empty string as an identity element of the operation;
  comparing the verification-use authentication tag and the authentication tag received to perform verification as to whether an alteration is present; and
  outputting a result of the verification.

15. The authentication tag verification method according to claim 14, comprising:
  generating, with respect to an item at an end of the partial string, a hash value for supply to the combining operation by the combiner, the hash value obtained by computing the hash function for information indicating that an index of the item is an end of the partial string.

16. The authentication tag verification method according to claim 14, comprising:
  according to the received authentication tag, setting, as the verification-use authentication tag,
  a value obtained by the combining operation of the individual hash values by the combiner;
  a value obtained by reducing a value obtained by the combining operation of the individual hash values by the combiner to a predetermined bit width; or
  a hash value obtained by computing a second hash function for the value obtained by the combining operation of the individual hash values by the combiner.

17. A non-transitory computer readable recoding medium storing therein a program causing a computer to execute authentication tag generation processing comprising:
  computing a hash function for each item included in a partial string obtained by dividing a message received according to a group testing matrix representing combinatorial group testing relating to the message; and
  generating an authentication tag for the partial string, using a value obtained by a combining operation of individual hash values by a combiner, in the combining operation, the individual hash values being combined by using a hash value of an item of an empty string as an identity element of the operation.

18. The non-transitory computer readable recoding medium according to claim 17, causing the computer to execute processing comprising: generating, with respect to an item at an end of the partial string, a hash value for supply to the combining operation by the combiner, the hash value obtained by computing the hash function for information indicating that an index of the item is an end of the partial string.

19. A non-transitory computer readable recoding medium, storing therein a program causing the computer to execute processing comprising:
  receiving a message to be verified, an authentication tag for each of partial strings obtained by division of the message according to a group testing matrix representing combinatorial group testing relating to the message, and the group testing matrix, as inputs, the authentication tag generated for the message using the group testing matrix by the authentication tag generation processing;
  computing a hash function for each item included in each of partial strings obtained by division according to the group testing matrix and generating a verification-use authentication tag for each of the partial strings using a value obtained by a combining operation of individual hash value, in the combining operation, the individual hash values being combined by using a hash value of an item of an empty string as an identity element of the operation;
  comparing the verification-use authentication tag and the authentication tag received to perform verification as to whether an alteration is present; and
  outputting a result of the verification.

* * * * *